United States Patent
Padmanabha et al.

(10) Patent No.: US 10,613,866 B2
(45) Date of Patent: Apr. 7, 2020

(54) METHOD OF DETECTING REPETITION OF AN OUT-OF-ORDER EXECUTION SCHEDULE, APPARATUS AND COMPUTER-READABLE MEDIUM

(71) Applicant: The Regents of the University of Michigan, Ann Arbor, MI (US)

(72) Inventors: Shruti Padmanabha, Ann Arbor, MI (US); Andrew Lukefahr, Ann Arbor, MI (US); Reetuparna Das, Ann Arbor, MI (US); Scott Mahlke, Ann Arbor, MI (US)

(73) Assignee: The Regents of the University of Michigan, Ann Arbor, MI (US)

( * ) Notice: Subject to any disclaimer, the term of this patent is extended or adjusted under 35 U.S.C. 154(b) by 167 days.

(21) Appl. No.: 15/478,552

(22) Filed: Apr. 4, 2017

(65) Prior Publication Data
US 2018/0285111 A1   Oct. 4, 2018

(51) Int. Cl.
*G06F 9/32* (2018.01)
*G06F 9/38* (2018.01)
*G06F 11/30* (2006.01)

(52) U.S. Cl.
CPC ............ *G06F 9/325* (2013.01); *G06F 9/381* (2013.01); *G06F 9/3808* (2013.01); *G06F 9/3836* (2013.01); *G06F 11/30* (2013.01)

(58) Field of Classification Search
CPC .................. G06F 9/30145; G06F 11/3409
See application file for complete search history.

(56) References Cited

U.S. PATENT DOCUMENTS

| | | | | |
|---|---|---|---|---|
| 9,436,512 B2* | 9/2016 | Peng | ........ | G06F 9/5083 |
| 2009/0164812 A1* | 6/2009 | Capps, Jr. | ........ | G06F 1/3203 713/320 |
| 2014/0223166 A1* | 8/2014 | Wu | ........ | G06F 1/3287 713/100 |
| 2015/0121048 A1* | 4/2015 | Lukefahr | ........ | G06F 9/30189 712/229 |
| 2015/0154021 A1* | 6/2015 | Padmanabha | ........ | G06F 9/30058 712/239 |

OTHER PUBLICATIONS

S. Padmanabha et al., "DynaMOS: Dynamic Schedule Migration for Heterogeneous Cores", *MICRO 2015*, Jan. 2015, 12 pages.

* cited by examiner

*Primary Examiner* — Michael J Metzger
(74) *Attorney, Agent, or Firm* — Nixon & Vanderhye P.C.

(57) ABSTRACT

A method, apparatus, and CRM that detect repetition of an out-of-order execution schedule for a group of instructions executed by an out-of-order processor. Data indicative of at least one performance metric for an instance of execution of said group of instructions by the out-of-order processor is determined. The determined data are compared with previous data of the at least one performance metric for at least one previous instance of execution of the group of instructions by the out-of-order processor. Repetition of the out-of-order execution schedule is detected dependent on the comparison.

18 Claims, 8 Drawing Sheets

| trace address | reordered instructions | | | | | | |
|---|---|---|---|---|---|---|---|
| a # 1 | i # 2 | i # 9 | i # 1 | . . . | | | |
| ⋮ | | | | | | | |

620-1
640-11
640-12
640-13
storage schedule 60

FIG. 6

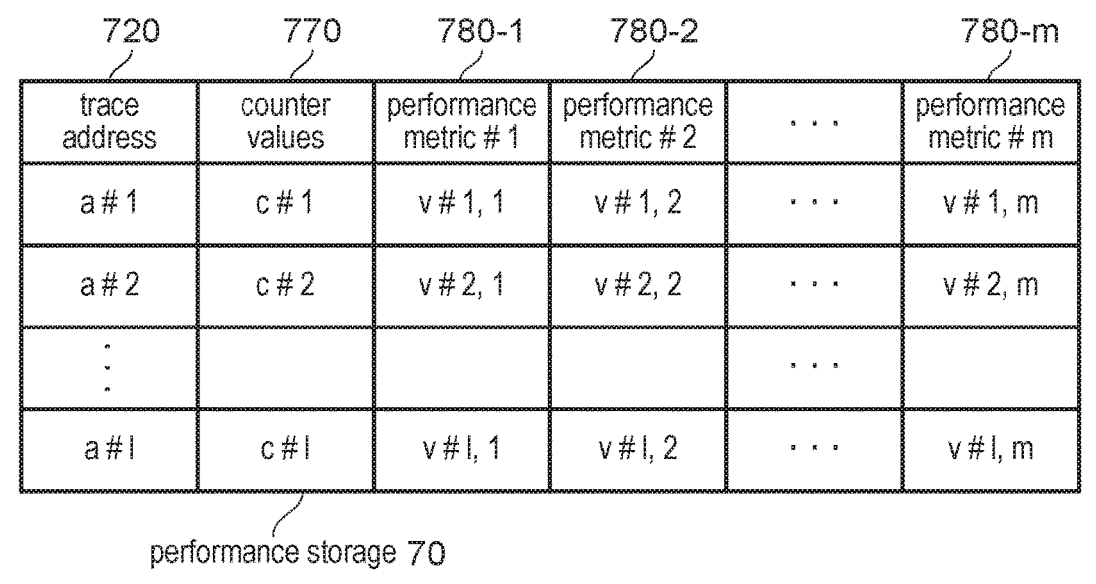

| trace address | counter values | performance metric # 1 | performance metric # 2 | ... | performance metric # m |
|---|---|---|---|---|---|
| a # 1 | c # 1 | v # 1, 1 | v # 1, 2 | ... | v # 1, m |
| a # 2 | c # 2 | v # 2, 1 | v # 2, 2 | ... | v # 2, m |
| ⋮ | | | | ... | |
| a # l | c # l | v # l, 1 | v # l, 2 | ... | v # l, m | performance storage 70

FIG. 7

METHOD OF DETECTING REPETITION OF AN OUT-OF-ORDER EXECUTION SCHEDULE, APPARATUS AND COMPUTER-READABLE MEDIUM

This invention was made with government support under grant SHF1217917 awarded by the National Science Foundation. The government has certain rights in the invention.

BACKGROUND

Technical Field

The present technique relates to the field of data processing.

Technical Background

In an out-of-order (OoO) processor, a group of instructions may be executed in a different order to the order in which they appear within the program being executed. For example, a later instruction in the program order may be executed ahead of an earlier instruction when the earlier instruction is waiting for operands to become available. OoO execution can help to improve processing performance by increasing instruction throughput.

SUMMARY

An example provides a method of detecting repetition of an out-of-order execution schedule for a group of instructions executed by an out-of-order processor, said method comprising:
determining data indicative of at least one performance metric for an instance of execution of said group of instructions by said out-of-order processor;
performing a comparison of said determined data with previous data of said at least one performance metric for at least one previous instance of execution of said group of instructions by said out-of-order processor; and
detecting repetition of said out-of-order execution schedule dependent on said comparison.

Another example provides an apparatus for detecting repetition of an out-of-order execution schedule for a group of instructions executed by an out-of-order processor, said apparatus comprising:
a determination unit configured to determine data indicative of at least one performance metric for an instance of execution of said group of instructions by said out-of-order processor;
a comparison unit coupled to said determination unit and configured to perform a comparison of said determined data with previous data of said at least one performance metric for at least one previous instance of execution of said group of instructions by said out-of-order processor; and
a detection unit coupled to said comparison unit and coupled to detect repetition of said out-of-order execution schedule dependent on said comparison.

Yet another example provides a non-transitory computer-readable medium storing instructions that, when executed by a computer, cause said computer to perform a method of detecting repetition of an out-of-order execution schedule for a group of instructions executed by an out-of-order processor, said method comprising:
determining data indicative of at least one performance metric for an instance of execution of said group of instructions by said out-of-order processor;
performing a comparison of said determined data with previous data of said at least one performance metric for at least one previous instance of execution of said group of instructions by said out-of-order processor; and
detecting repetition of said out-of-order execution schedule dependent on said comparison.

BRIEF DESCRIPTION OF THE DRAWINGS

Further aspects, features and advantages of the present technique will be apparent from the following description of examples, which is to be read in conjunction with the accompanying drawings, in which:
FIG. 6 schematically illustrates an example of schedules of groups of instructions;
FIG. 7 schematically illustrates an example of performance metrics of groups of instructions.

DETAILED DESCRIPTION

Figure 1:
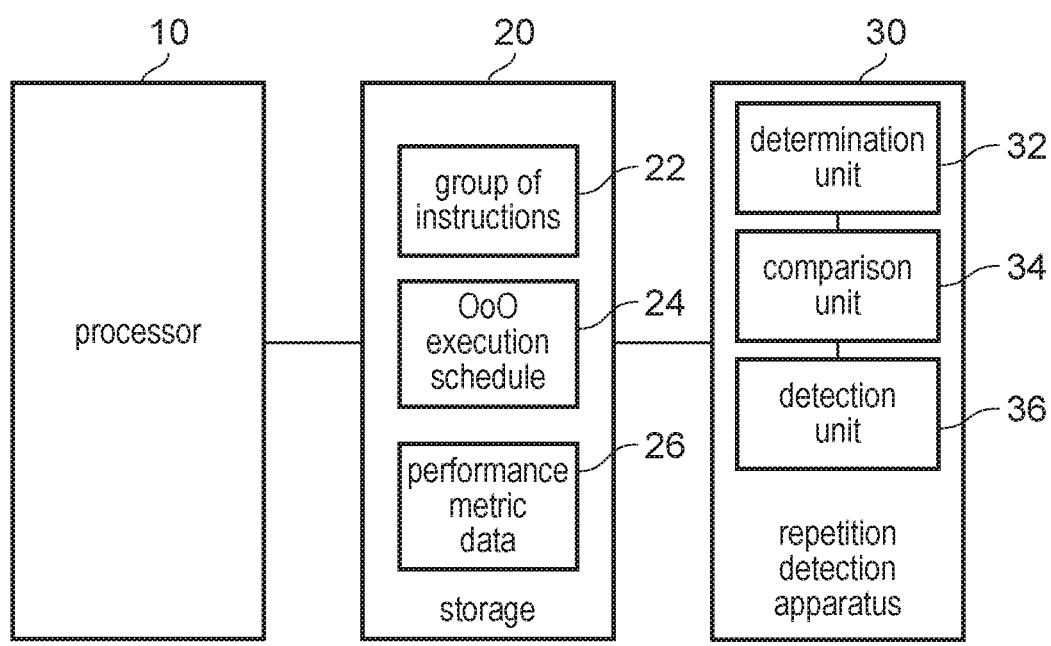
FIG. 1 schematically illustrates an example of a repetition detection system.

Some specific examples are described below. It will be appreciated that the claims are not limited to these particular examples.

The capability on an OoO processor to outperform an InO processor may come, at least in part, from its ability to speculate past stalled loads and/or long-latency instructions, eliminate false dependencies between instructions, and execute instructions out of order. An OoO processor may create, after resolving dependencies and resource constraints, for a group of instructions an OoO execution schedule, providing a sequence in which the instructions of the group of instructions are to be executed. When the sequence of instructions tends to repeat, e. g. in loops or repeated calls of the same function, the schedules created by the OoO processor may also repeat, but do not always repeat exactly. For example, on some instances a given instruction may encounter a long delay not seen on other instances of execution of the same group of instructions, so that this causes different schedules of OoO execution on different instances. Other loops or functions may be more predictable and run with a similar schedule for all instances. Hence, the OoO processor dynamically recreates the OoO execution schedule, which could vary or repeat for different instances of execution of the same group of instructions from the program order.

Sometimes, it may be desirable to determine whether the execution schedule for a given block of instructions is repeating. For example, if repetition of a particular schedule is identified for a given block of instructions on an OoO processor, this may indicate that the repeated schedule is a more efficient ordering for the instructions than the original program order, which can be useful information for improving scheduling of the same group of instructions on an in-order processor which does not have the ability to dynamically reorder the execution order, for example. Also, it could be useful for debugging purposes to know whether an execution schedule on an OoO processor is repeating between different instances of execution of a given group of instructions.

One approach for determining whether the OoO execution schedule is repeated could be to store a sequence of instruction addresses corresponding to the order in which the group of instructions were executed in a previous OoO execution schedule, and for each subsequent instance of execution of the group of instructions compare the instruction addresses of the executed instructions against the instruction addresses of the previously seen OoO execution schedule to determine whether the schedules are the same. However, this approach can be expensive to implement in hardware, as it may require a large number of address comparisons.

In the technique described below, a method for determining repetition of an out-of-order execution schedule for a group of instructions executed by an out-of-order processor comprises determining data indicative of at least one performance metric for an instance of execution of said group of instructions by the out-of-order processor, performing a comparison of the determined data with previous data of the at least one performance metric for at least one previous instance of execution of the group of instructions by the out-of-order processor, and detecting repetition of said out-of-order execution schedule dependent on the comparison.

Hence, at least one performance metric may be used to evaluate whether the OoO execution schedule is repeated. The performance metric can provide a more indirect indication of whether the schedule is likely to have repeated, than the actual sequence of instruction addresses. The performance metric could be a parameter gathered across the group of instruction as a whole, so may only require a comparison to be performed once per group of instructions rather than individual instruction address comparisons once (or multiple times) per individual instruction, so comparison of the performance metric may be more efficient to implement in hardware. Also, by using performance metrics to evaluate repetition of the execution schedule, this allows two execution schedules to be considered similar even if there are slight differences in the exact sequence of executed instruction addresses, but which nevertheless are similar enough to justify being considered a repeated schedule. This would be difficult to implement using explicit address comparisons of the executed instruction addresses.

In general, repetition of said out-of-order execution schedule may be detected, when a degree of similarity between said determined data and said previous data is larger than a predetermined threshold. The similarity could be evaluated in a number of ways, e.g. using scoring functions or a confidence-counter approach as discussed below. The threshold can be set so that it is not essential for the current and previous OoO execution schedules to be identical in order for repetition to be detected. This may be desirable for example to avoid minor differences in scheduling being interpreted as a widely different schedule. For example, in a superscalar processor in which multiple instructions are issued for execution per cycle, the first instruction of a group could be encountered in different instruction slots within the same cycle, which could cause a minor knock on effect on the distribution of subsequent instructions across subsequent cycles, but which may not be desirable to flag as a different performance schedule, as opposed to cases when a more significant event such as a long latency cache access has caused instructions to be delayed, so that entirely different schedules are executed. Hence, exact repetition is not necessarily required in order to detect a repeating schedule.

The partitioning of the instructions of a given program into the respective groups could be done at arbitrary instruction addresses (e.g. the groups could correspond to blocks of instructions of a certain fixed size). However, given that an execution schedule is most likely to repeat when a program loop or function is encountered, and program loops or functions may often be separated by branch instructions, one way of partitioning instructions into groups can be for each group to start or end with a backwards branch instruction (a branch instruction which branches to an instruction address which is earlier in the program code than the address of the branch instruction itself). This partitioning approach tends to increase the likelihood that a repeating OoO execution schedule can be detected for a given group of instructions. Group boundaries could also occur in response to other events such as exceptions or interrupts, or when the number of instructions in the group becomes larger than the maximum number of instructions able to be tracked in one group—in this case a new group can be restarted even if there is no other event which would normally signify a group boundary.

The performance metric used for evaluating repetition of the execution schedule could be any of a range of metrics gathered quantifying some aspect of the execution of the group of instructions. For example, the metric could indicate a number of events of a given type that occurred during execution of the group of instructions, or some other property of execution of the group. The performance metric may define a characteristic of execution of the group of instructions as a whole, rather than being separated into metrics relating to individual instructions. Examples of performance metrics which could be used may include at least one of:

- A number of instructions executed in an instance of execution of said group of instructions. For example, on some instances of execution of a given group of instructions, a conditional branch could branch past some instructions of the group so that fewer instructions are executed compared to another instance, or a conditional instruction may fail its condition codes and so may not be executed. Hence, the number of instructions executed in the group could vary from instance to instance, and this may be an indication that the execution schedule may not repeat.
- A number of cycles required for an instance of execution of said group of instructions. For example, a counter may count the number of elapsed processing cycles between a first instruction of the group and a last instruction of the group. If the total number of cycles taken to execute the group of instructions differs significantly from instance to instance, this may indicate that some instructions have encountered long latency events such as cache misses, which would often be events leading to rescheduling of the execution sequence and hence make it more likely that the execution schedule has not repeated.
- A number of cache hits achieved in an instance of execution of said group of instructions, or number of cache misses incurred in an instance of execution of said group of instructions. As cache access latency is often a factor in scheduling the OoO execution order, if the number of cache hits/misses varies from instance to instance of execution of a given group of instructions, it may be more likely that the execution schedule has not repeated.

A number of branch mispredictions incurred in an instance of execution of said group of instructions. Branch mispredictions may lead to some speculatively executed instructions being cancelled and other instructions re-executed, making it unlikely that the execution schedule is the same as on an occasion when fewer branch mispredictions occurred.

A number of instructions brought forward within said out-of-order execution schedule in an instance of execution of said group of instructions relative to instructions of said group of instructions being in order. For example, a counter within a reorder buffer of an OoO processor may determine the number of brought-forward instructions, and hence when the number of brought-forward instructions differs from instance to instance, this may indicate that the execution schedule is not the same.

Hence, these examples indicate how indirect performance metrics can give an indication of a likelihood that an execution schedule is repeated without needing to actually compare the individual instruction addresses of each executed instruction against a previous schedule. It will be appreciated that other metrics could also be used.

In some cases, two or more performance metrics may be used for the comparison process. For example, for each of the two or more performance metrics, a separate comparison may be made between the determined data providing that performance metric for the current instance of execution of the group of instructions, and the previous data providing the corresponding performance metric for the previous instance of execution of the same group of instructions. The determination of whether the schedule is repeated may be a function of each of the individual comparisons for the two or more different types of performance metrics. In some implementations, a scoring function may combine the comparison results of the two or more individual metric comparisons according to some scoring algorithm.

However, a more area and power efficient technique for implementing the comparison in hardware can be to provide a counter corresponding to a given group of instructions which is updated in dependence on the comparison of the determined data and the previous data for that given group of instructions, and to detect whether the OoO execution schedule is repeated for that group of instructions dependent on the value of the counter. Providing such a counter can make it more efficient to consider the effects of multiple different performance metrics on the repetition determination (avoiding a need for more complicated logic for combining the metrics in some scoring algorithm), as well as enabling for some hysteresis where one instance of non-repetition of a schedule does not necessarily prevent that group of instructions being considered "repeatable" for future instances.

For example, a counter value of the counter may be incremented by a predetermined instance value for an instance of repetition of the out-of-order execution schedule for said group of instructions. The counter value could be decremented by at least one predetermined penalty value, when the determined data and the previous data differ for at least one performance metric being compared. Repetition of the out-of-order execution schedule may be detected dependent on a comparison of the counter value and a predetermined confidence value. For example, if the increment corresponds to adding a value to the counter, and decrement corresponds to subtracting a value from the counter, the comparison could determine whether the counter value is greater than the predetermined confidence value. Other implementations could interpret a lower count value as higher confidence in repetition than a higher count value, in which case the increment may correspond to subtraction and the decrement to addition and the comparison may consider whether the count value is less than the threshold. A number of separate counters may be maintained for tracking different groups of instructions. For example, a cache-like structure may have a number of entries which can be allocated to particular groups of instructions and each comprise a counter updated in response to the comparison of performance metrics for that group of instructions.

Different penalty values can be defined for different performance metrics. Hence, the effect on the counter value when one type of performance metric is detected as mismatching may be greater than the effect when another type of performance metric is detected as mismatching. For example, the at least one predetermined penalty value may comprise at least one of: at least one minor penalty value for indicating a minor difference between said determined data and said previous data; and at least one major penalty value for indicating a major difference between said determined data and said previous data. The major penalty value may be greater than the minor penalty value. Whether the counter value is decremented based on the major or minor penalty value in the event of a mismatching performance metric may be selected in dependence on which particular performance metric of the at least one performance metric differs between the determined data and the previous data. Hence, some performance metrics may be considered more significant than others in providing an indication of whether the schedule is repeated.

For at least one performance metric, the at least one predetermined penalty value (e. g. one of the major penalty values) may be capable of decrementing said counter value to ensure that the comparison of the counter value and the predetermined confidence threshold value will detect non-repetition of the execution schedule. For example, the predetermined penalty value may be defined so that, regardless of the current value of the counter, decrementing the counter by the predetermined penalty value brings the counter to the side of the threshold corresponding to non-repetition. For example, the predetermined penalty value may correspond to a value greater than a difference between the predetermined confidence threshold and a minimum or maximum value of the counter on the side of the threshold corresponding to repetition being detected.

The relative importance of different types of performance metrics may differ from implementation to implementation, so whether a given type of metric is considered to map to the major penalty value or a minor penalty value may vary from implementation to implementation. However, in one example the following performance metrics may correspond to minor penalty values: number of cycles required for execution of the group of instructions; number of cache hits or misses; and number of reordered instructions brought forward in the out-of-order execution schedule relative to in-order execution of the instructions in the original program order. The major penalty value could be used for cases when a difference is detected for other types of performance metric such as the total number of instructions executed in the group, and the number of branch mispredictions incurred. While the examples discussed above describe two levels of penalty value (major and minor), it will be appreciated that it is also possible to define three or more different levels of penalty value for different performance metrics, to decrement the confidence counter in the event of a mismatch by an amount corresponding to the relative significance of that performance metric in determining the likelihood of repetition.

The repetition detection method may be useful for a number of purposes. In one example, when repetition of the out-of-order execution schedule is detected, the out-of-order execution schedule may be memoized. That is, the schedule may be stored for future reference so that it is then possible to execute the instructions from the same schedule without needing to actually evaluate the dynamic conditions (such as operand availability) which were considered at the time of creating the schedule the first time. For example, the processor may include a cache-like storage structure to cache sequences of addresses corresponding to groups of instructions for which execution was previously detected.

In some cases, the memoized OoO execution schedule could be reused within the same processing pipeline as the pipeline in which the schedule was previously detected as repeating. For example, dynamic recreation of the out-of-order execution schedule for a given group of instructions may be paused when the out-of-order execution schedule is memoized for that group of instructions. Hence, instances of the group of instruction can be executed based on memoized schedule, when the out-of-order execution schedule is memoized. This means it is not necessary to perform the register comparisons or other operations associated with checking inter-instruction dependencies and operand availability when dynamically creating the schedule for the first time. Power can therefore be saved and performance improved by simply issuing the group of instructions according to the memoized schedule and turning off or power gating issue logic for dynamically recreating the schedule.

In another example, the memoized OoO schedule could be used by a different processing pipeline to the processing pipeline in which the OoO schedule was detected as repeating. The other processing pipeline could be in a completely separate processing device, or could be another processor core in a multi-core processing device. Hence, execution of instances of the out-of-order execution schedule may be transferred from the out-of-order processor to another processor, when repetition of said out-of-order execution schedule is detected. Transferring execution of instances of the out-of-order execution schedule may comprise outputting the out-of-order execution schedule from the out-of-order processor, and inputting the output out-of-order execution schedule in the other processor. Hence, when it is detected that the OoO schedule is repeating for a given group of instructions, this indicates that the dynamic reordering capability of the OoO processor may not be required for efficient execution of that group of instructions, and so by transferring the group of instructions to another processor this can free up resource in the OoO processor for executing other groups of instructions for which the behaviour varies more from instance to instance of executing the same group of instruction, so that the reordering capability of the OoO processor is more beneficial. The other processor to which execution of the group of instructions is transferred could be an in-order processor which has no reordering capability (but merely fetches instructions in the order specified by the OoO execution schedule memoized by the OoO processor), or could be another OoO processor (e. g. with its dynamic reordering logic turned off to save power if not required for execution of the current workload).

Alternatively, rather than using the identified execution schedule within the processing device itself, the out-of-order execution schedule could be output to an external device, when repetition of said out-of-order execution schedule is detected.

FIG. 1 schematically illustrates an example of a repetition detection system 1. The repetition detection system 1 may comprise a processor 10, storage 20 coupled to the processor 10 and repetition detection apparatus 30 coupled to the storage 20.

The processor 10 may be an OoO processor. The processor 10 may comprise one or more processing cores. The one or more processing cores may comprise an OoO core. The one or more processing cores may comprise an In-order (InO) core. The processor 10 may be configured to process instructions. The processor may be a superscalar processor being configured to process more than one instruction, for example two or four instructions, at a time. The instructions may comprise a group, block or sequence of instructions 22. The processor 10 may be configured to execute the group of instructions 22 in a program order. The processor 10 may be configured to create an OoO execution schedule 24 reordering the group of instructions 22 in an issue order and execute the reordered group of instructions in the issue order. Table 1 shows an example of the group of instructions 22 in the program order, with their number in the program order. In Table 1, the instructions comprise instructions in assembly language, e. g. "ldr" for "load register", "str" for "store register", "cmp" for "compare" and "b" for "branch", and a label "HEAD" indicates a target for the instruction "b HEAD". Assembly language is generally known in the art, and the present technique is not limited to the instructions shown in the example. Table 2 shows an example of the reordered group of instructions in the issue (execution) order, with their numbers, for a superscalar processor with two issue slots. For each instance of execution of the group of instructions 22 (repetition), the processor 10 may dynamically recreate an OoO execution schedule 24 for the instance, or reuse the OoO execution schedule 24 previously created for the group of instructions 22, when possible. The reuse of an existing OoO execution schedule 24 may reduce consumption of resources, e. g. energy, and/or time.

TABLE 1

Example of group of instructions in program order

| # | instruction |
|---|---|
| 1 (HEAD) | ldr r2, [r5] |
| 2 | str r2, [r4] |
| 3 | add r5, r2, #4 |
| 4 | add r4, r4, #4 |
| 5 | add r1, r1, #1 |
| 6 | cmp r1, r6 |
| 7 | b HEAD |

TABLE 2

Example of reordered group of instructions in issue order

| # | Issue slot 1 | Issue slot 2 |
|---|---|---|
| 1, 3 | ldr r2, [r5] | add r5, r2, #4 |
| 2, 5 | str r2, [r4] | add r1, r1, #1 |
| 4, 6 | add r4, r4, #4 | cmp r1, r6 |
| 7 | b HEAD | |

The storage 20 may store the group of instructions 22 and out-of-order execution schedule 24 (note that the schedule 24 may not be stored for all groups of instructions 22, but may be memoized for a subset of groups of instructions for which repetition of the schedule was previously detected—for other groups there may be no storage of the schedule as instead the issue logic in the processor may simply detect on an instruction-by-instruction basis which instructions to issue for execution in the next cycle). As will be explained below, the storage 20 may further store data indicative of at least one performance metric (performance metric data) 26 for one or more instances of execution of the group of instructions 22.

The repetition detection apparatus 30 may comprise a determination unit 32, comparison unit 34 coupled to the determination unit 32, and detection unit 36 coupled to the comparison unit 34. The determination unit 32 may be configured to determine the performance metric data 26 for an instance of execution of the group of instructions 22 by the processor 10. The performance metric may comprise at least one of:

a number of instructions executed in an instance of execution of the group of instructions 22;

a number of cycles required for an instance of execution of the group of instructions 22;

a number of cache hits achieved in an instance of execution of the group of instructions 22;

a number of cache misses incurred in an instance of execution of the group of instructions 22;

a number of branch mispredictions incurred in an instance of execution of the group of instructions 22; and a number of instructions brought forward within the OoO execution schedule 24 in an instance of execution of the group of instructions 22 relative to instructions of the group of instructions 22 being in order.

The determined performance metric data 26 may be stored in the storage 20. The comparison unit 34 may be configured to perform a comparison of the determined performance metric data with previous performance metric data for at least one previous instance of execution of the group of instructions 22 by the processor 10. The performance metric data 26 in the storage 20 may comprise the previous performance data and/or determined performance metric data. The detection unit 36 may be configured to detect repetition of the OoO execution schedule 24 dependent on the comparison. The detection of repetition dependent on the comparison of performance metrics 26 in lieu of the OoO execution schedules 24 may reduce consumption of resources, e. g. space for hardware implementation, and/or time. Further, it may be less stringent and, thus, improve quality and/or stability of the detection. Furthermore, consideration of a plurality of performance metrics may further improve quality/or stability of the detection.

The detection unit 36 may be configured to detect the repetition of the OoO execution schedule 24, when a degree of similarity between the determined data and the previous data is larger than a predetermined threshold.

The repetition detection apparatus 30 may further comprise a counter (not shown) and be configured to update the counter in dependence on the comparison of the determined performance metric data and previous performance metric data, and detection unit 36 may be configured to detect the repetition of the OoO execution schedule 24 dependent on the counter. Further, the repetition detection apparatus 30 may be further configured to increment a counter value of the counter by a predetermined instance value, e. g. one, for an instance of repetition of the OoO execution schedule for the group of instructions. Alternatively, the repetition detection apparatus 30 may be further configured to increment the counter value by the predetermined instance value for an instance of execution of said group of instructions. Simply incrementing the counter value for each instance of execution of said group of instructions may be easier to implement and, thus, may reduce consumption of resources, e. g. space for hardware implementation, and/or time. Furthermore, the repetition detection apparatus 30 may be further configured to decrement the counter value by a predetermined penalty value, when the determined data and the previous data differ. The repetition detection apparatus 30 may be further configured to select whether to decrement the counter value based on a minor penalty value or a major penalty value in dependence on which one of the performance metrics the determined performance data and the previous performance metrics data differ. The repetition detection apparatus 30 may be further configured to decrement the counter value by a minor penalty value for indicating a minor difference between the determined data and the previous data. The minor difference may include a difference between numbers of cycles required for at least two instances; difference between numbers of cache hits achieved in at least two instances; difference between numbers of cache misses incurred in at least two instances; and a difference between numbers of instructions brought forward within the OoO execution schedule in at least two instances relative to instructions of the group of instructions being in order, for example. The repetition detection apparatus 30 may be further configured to decrement the counter value by a major penalty value for indicating a major difference between the determined data and the previous data. The major difference may include a difference between numbers of instructions executed in at least two instances; and difference between numbers of branch mispredictions incurred in at least two instances, for example. There may be a plurality of penalty values for a plurality of performance metrics, that may include a plurality of minor penalty values and/or a plurality of major penalty values. The performance metrics may have individual, different penalty values. Table 3 shows examples of penalty values for examples of performance metrics. Table 3 further shows examples of types of penalty values for the examples of the performance metrics.

TABLE 3

Examples of penalty values for examples of performance metrics

| performance metric | type of penalty value | penalty value |
|---|---|---|
| number of cycles | minor | 1 |
| number of cache hits | minor | 1 |
| numbers of cache misses | minor | 2 |
| number of instructions brought forward within OoO execution schedule relative to instructions of the group of instructions being in order | minor | 2 |
| numbers of instructions | major | 3 |
| numbers of branch mispredictions | major | 4 |

It will be appreciated that this is just one example of possible penalty values which could be assigned to different performance metrics.

The repetition detection apparatus 30 may be further configured to detect repetition of the OoO execution schedule 24, when the counter value is larger than or equal to a predetermined confidence value, e. g. five, and/or detect non-repetition of the OoO execution schedule 24, when the counter value is smaller than the predetermined confidence value. The predetermined penalty value may be capable of decrementing the counter value such that the counter value is smaller than the predetermined confidence value. For example, if the maximum value of the counter is 7 for a 3-bit counter and the threshold is 5, then the major penalty values of 3 and 4 for the total number of instructions executed and branch mispredictions are defined as shown above so that regardless of the current value of the counter, decrementing by the major penalty value results in the counter value dropping below the threshold 5. Hence, the total executed instruction count and the number of branch mispredictions may be "showstopper" metrics for which a mismatch immediately rules out the schedule being detected as repeating, while the other metrics mapping to minor penalty counts can accommodate a schedule being detected as repeating even if there is a mismatch in the previous and current data for that metric, as decrementing by the minor penalty value does not necessarily bring the count below the threshold.

The processor 10 may be further configured to memoize the OoO execution schedule 24, when repetition of the OoO execution schedule 24 has been detected.

The processor 10 may be further configured to pause dynamic recreation of the OoO execution schedule 24, when the OoO execution schedule 24 has been memoized.

The processor 10 may be further configured to execute instances of the OoO execution schedule 24 based on the memoized schedule, when the OoO execution schedule 24 has been memoized.

Figure 2:
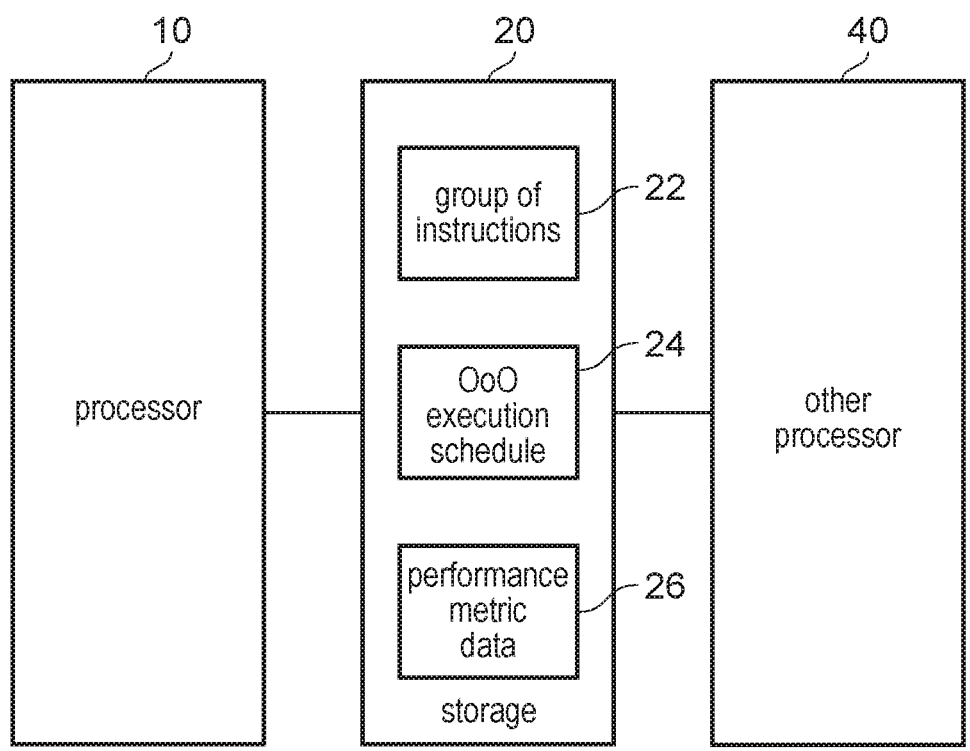
FIG. 2 schematically illustrates an example of a multi-processor system.

FIG. 2 schematically illustrates an example of a multi-processor system 2. The multi-processor system 2 may comprise the processor 10, storage 20 coupled to the processor 10 and another processor 40 coupled to the storage 20.

The processor 10 may be configured as already described with reference to FIG. 1. The other processor 40 may be an OoO processor or InO processor, for example. Execution of instances of the OoO execution schedule 24 may be transferred from the processor 10 to the other processor 40, when repetition of the OoO execution schedule 24 has been detected. The transfer of execution of instances of the OoO execution schedule 24 from the processor 10 to the other processor 40 may comprise outputting the OoO execution schedule 24 from the processor 10; and inputting the output OoO execution schedule 24 in the other processor 40. The other processor 40 may execute the transferred OoO execution schedule 24 in lieu of the processor 10. As the memoized OoO execution schedule 24 may be reused on the InO processor 40, that is less complex than the OoO processor 10, consumption of resources may be reduced.

Figure 3:
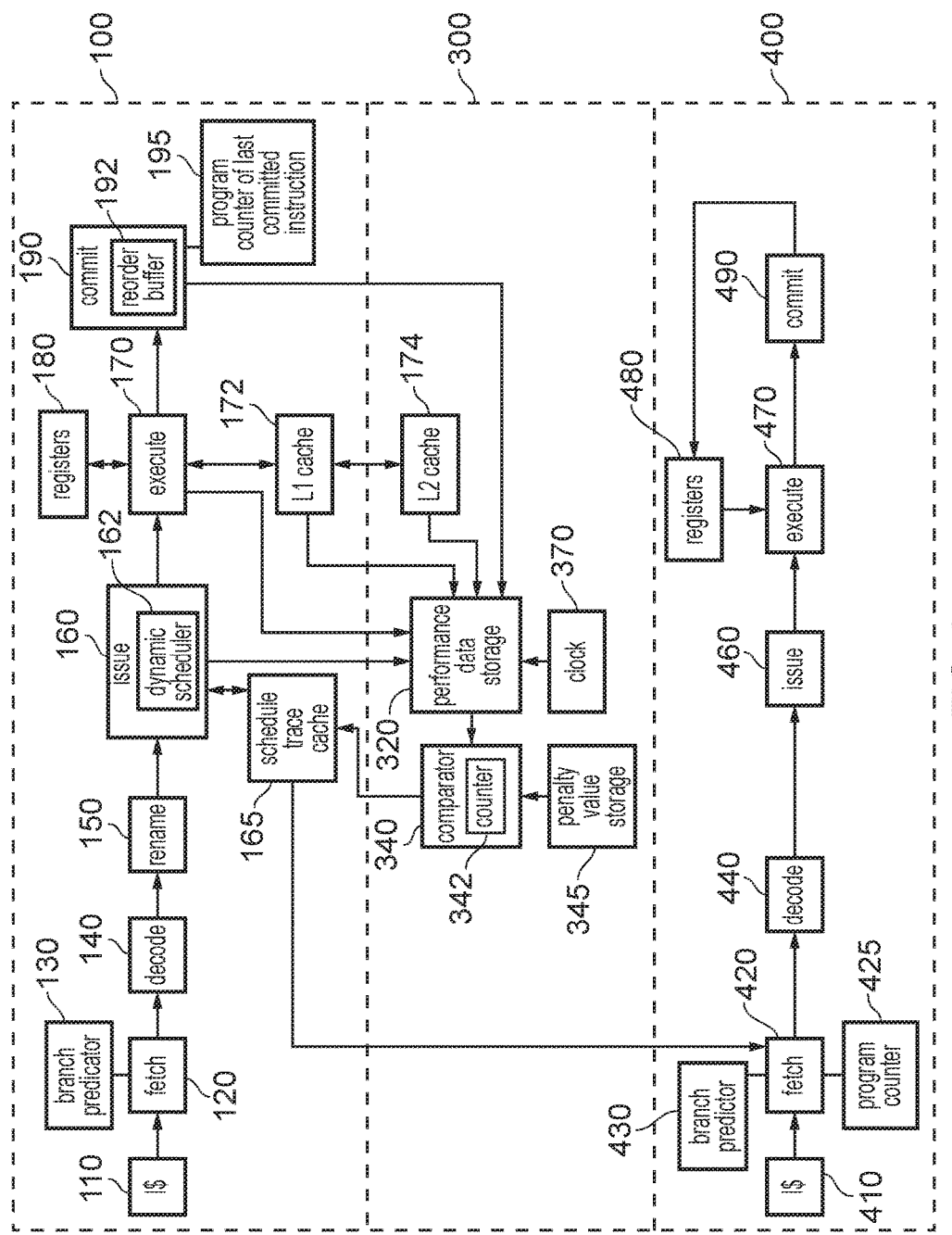
FIG. 3 schematically illustrates an example of an out-of-order processor and in-order processor system 3.

FIG. 3 schematically illustrates an example of an out-of-order processor and in-order processor system 3. The system 3 comprises an OoO processor ("big") 100, a controller 300 and an InO processor ("little") 400.

The OoO processor 100 comprises an OoO processing pipeline. The OoO processing pipeline may comprise a fetch stage 120 for fetching instructions followed by a decode stage 140 for decoding the instructions followed by a rename stage 150 for renaming registers specified by the instructions followed by an issue stage 160 for issuing the instructions followed by an execute stage 170 for executing the instructions followed by a commit stage 190 for committing results of instructions to architectural state. The fetch stage 120 may be coupled to an instruction storage (e. g. a cache or memory) 110 and a branch predictor 130 for predicting outcomes of branch addresses to control non-sequential changes of program flow. The issue stage 160 may comprise a dynamic scheduler 162 for dynamically scheduling the instructions (e. g. in dependence on register dependencies between instructions and on the timing at which operands for instructions become available as they are generated in response to previous instructions). The issue stage 160 may be coupled to a schedule trace cache (STC) 165 for caching OoO execution schedules for selected groups of instructions. When the first instruction of a group of instructions having a schedule memoized in the STC 165 is detected by the issue stage 160, the issue stage 160 issues the instructions of that group in the order specified by the STC, instead of dynamically scheduling the execution order using the dynamic scheduler 162. The execute stage 170 may be coupled to registers 180 for storing operand values used as inputs to processing operations performed by the execute stage 170. The execute stage 170 may be coupled to a level-1 cache 172. The level-1 cache 172 may be coupled to a level-2 cache 174. The commit stage 190 may comprise a reorder buffer 192 for tracking the completion of instructions executed out of order. A given instruction may be committed when it has completed execution in the execute stage 170 and any earlier instruction in the original program order has also completed execution. When an instruction is committed, its results may be committed to architectural state. Until an instruction is committed, it may still be possible to rewind its effects and restore the current architectural state stored in the registers 180 to previous architectural state corresponding to the last committed instruction. The commit stage 190 may be coupled to a program counter of the last committed instruction 195. Thus, the OoO processor 100 may be configured to create an OoO execution schedule reordering a group of instructions in an issue order which may differ from the original program order and execute the reordered group of instructions in dependence on the OoO execution schedule.

The controller 300 (which could in other examples be considered part of the OoO processor 100) may comprise a performance data storage 320, comparator 340, penalty value storage 345 and clock 370. The performance data storage 320 may be coupled to the issue stage 160, execute stage 170, level-1 cache 172, level-2 cache 174, commit stage 190 and clock 370 for receiving and storing performance metrics data indicative of performance metrics for instances of execution of the group of instructions. For example, various performance counters may be provided which are incremented in response to occurrence of events such as branch mispredictions, cache hits or misses, instructions being executed, or instructions being reordered. A cycle counter may also count a number of elapsed processing cycles. At the end of a group of instructions, the current count values of the performance counters may be stored to the performance data storage 320 and the counters reset to restart counting for a next group of instructions. The comparator 340 may be coupled to the performance data storage 320 and/or penalty value storage 345. The comparator 340 may comprise a confidence counter 342. The comparator 340 may configured to update the confidence counter 342 in dependence on the performance metrics data for instances of execution of the group of instructions on the OoO processor 100 stored in the performance data storage 320 and penalty values stored in penalty value storage 345, and detect repetition of the OoO execution schedule based on a counter value of the confidence counter 342. In other examples, there may be no need for penalty value storage 345 as the penalty values associated with particular metrics may be hardwired in the circuitry of the controller 300. The schedule trace cache 165 may be coupled to the comparator 340. The schedule trace cache 165 may be configured to memoize the OoO execution schedule, when the comparator 340 detects repetition of the OoO execution schedule. The OoO processor 100 may be configured to pause dynamic recreation of said OoO execution schedule, when the schedule trace cache 165 has memorized the OoO execution schedule.

The InO processor 400 comprises an InO processing pipeline. The InO processing pipeline may comprise a fetch stage 420 for fetching instructions followed by a decode stage 440 for decoding the instructions followed by an issue stage 460 for issuing the instructions followed by an execute stage 470 for executing the instructions followed be a commit stage 490. The fetch stage 420 may be coupled to an instruction storage 410, a branch predictor 130, and a program counter 425. The execute stage 470 may be coupled to registers 480. The registers 480 may be coupled to the commit stage 490. Thus, the InO processor 400 may be configured to execute a group of instructions in a given order. The fetch stage 420 may be further coupled to the schedule trace cache 165. Thus the InO processor 400 may be configured to execute the group of instructions according to the memorized OoO execution schedule, when the schedule trace cache 165 has memorized the OoO execution schedule. Unlike the OoO processor 100, the InO pipeline has no rename stage 150 for mapping architectural register specifiers specified by decoded instructions to physical register specifiers identifying physical registers provided in hardware, and also has no reorder buffer. The commit stage 490 of the InO pipeline may simply write results of executed instructions to the register file 480 in the order the instructions are executed.

Figure 4:
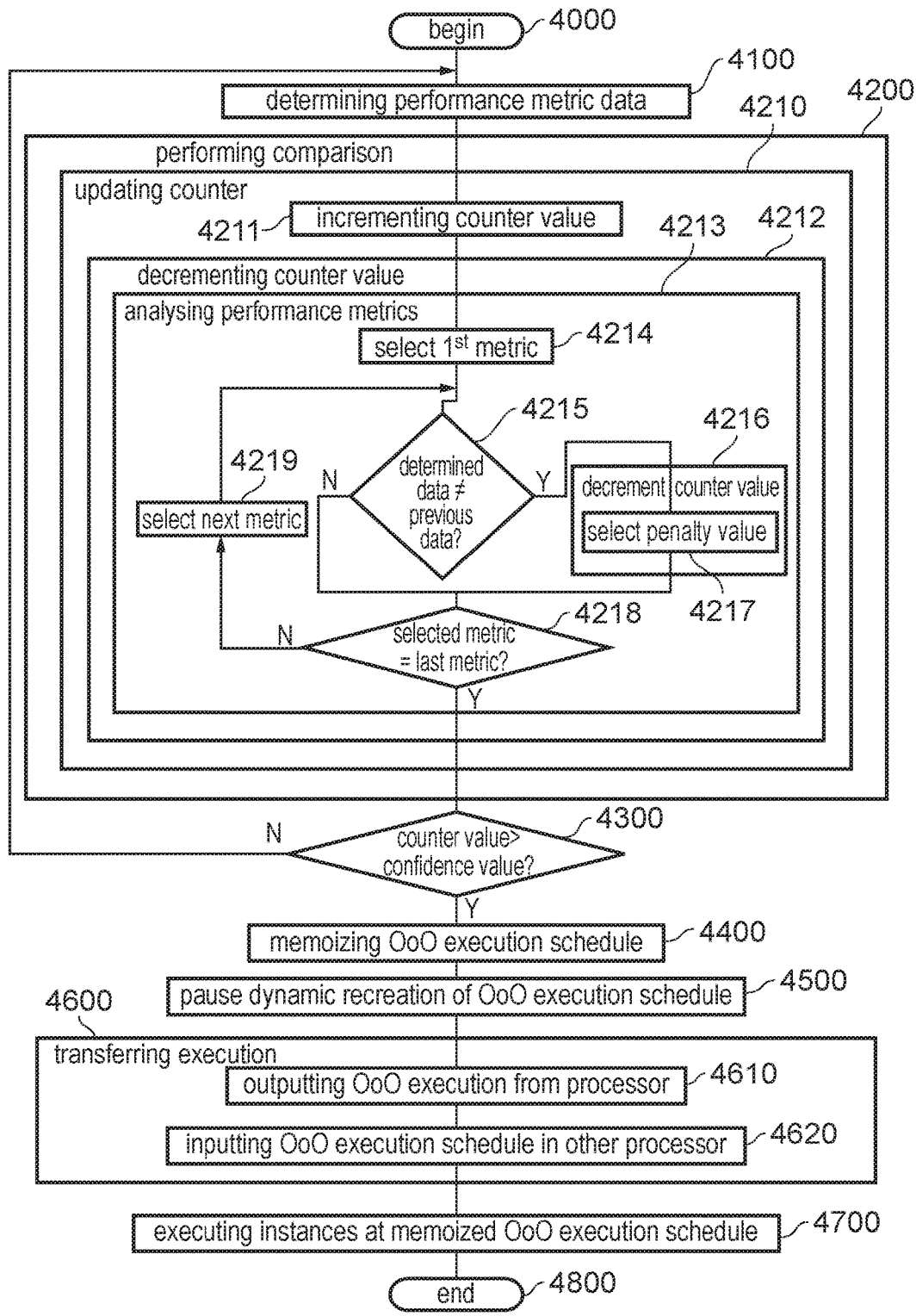
FIG. 4 schematically illustrates an example of a repetition detection method.

FIG. 4 schematically illustrates an example of a repetition detection method 4 for an OoO execution schedule 24 for a group of instructions 22 executed by an OoO processor 10. The repetition detection method 4 begins at step 4000.

At step 4100, the method 4 may determine data indicative of at least one performance metric for an instance of execution of the group of instructions 22 by the OoO processor 10. The processor may have dynamically created the OoO schedule 24 for the instance.

At step 4200, the method 4 may perform a comparison of the determined data with previous data 26 of the at least one performance metric for at least one previous instance of execution of the group of instructions 22 by the OoO processor 10. At step 4210, the method may update a counter. In more detail, the method 4 may, in step 4211, increment a counter value of the counter by the predetermined instance value and/or decrement the counter value at step 4212. Decrementing the counter value may comprise analysing performance metrics at step 4213. The method 4 may, at step 4214, select a first performance metric. When the determined data and previous data of the selected performance metric differ at step 4215, the counter value may be decremented by a penalty value corresponding to the selected performance metric at step 4216. The penalty value may be selected from a minor penalty value and major penalty value in step 4217. When the selected performance metric is not a last performance metric at step 4218, the method 4 may select a next performance metric in step 4219 and return to step 4215. When the selected performance metric is a last performance metrics at step 4218, the method 4 may proceed to step 4300.

At step 4300, the method 4 may detect repetition of the OoO execution schedule 24 dependent on the comparison. In more detail, when the counter value is smaller than a confidence value, non-repetition of the OoO execution schedule 24 is detected, and the method 4 may return to step 4100. When the counter value is larger than a confidence value, repetition of the OoO execution schedule 24 is detected, and the method 4 may proceed to step 4400.

At step 4400, the method 4 may memoize the OoO execution schedule 24. At step 4500, the method 4 may pause dynamic recreation of the OoO execution schedule 24. At step 4600, the method 4 may, optionally, transfer execution of the OoO execution schedule 24 from the OoO processor 10 to another processor 30. In more detail, the method may, at step 4610, output the OoO execution schedule 24 from the OoO processor 10 and, at step 4620, input the OoO execution schedule 24 in the other processor 30. At step 4700, the method may execute the instances of memoized OoO execution schedule 24, on the OoO processor 10 or, when applicable, the other processor 30.

The repetition detection method 4 ends at step 4800.

The method 4 may be implemented by instructions executable by a processor 10, 30 or computer 80. The instructions may be stored on a computer-readable medium, e. g. non-transitory computer-readable medium.

Figure 5:
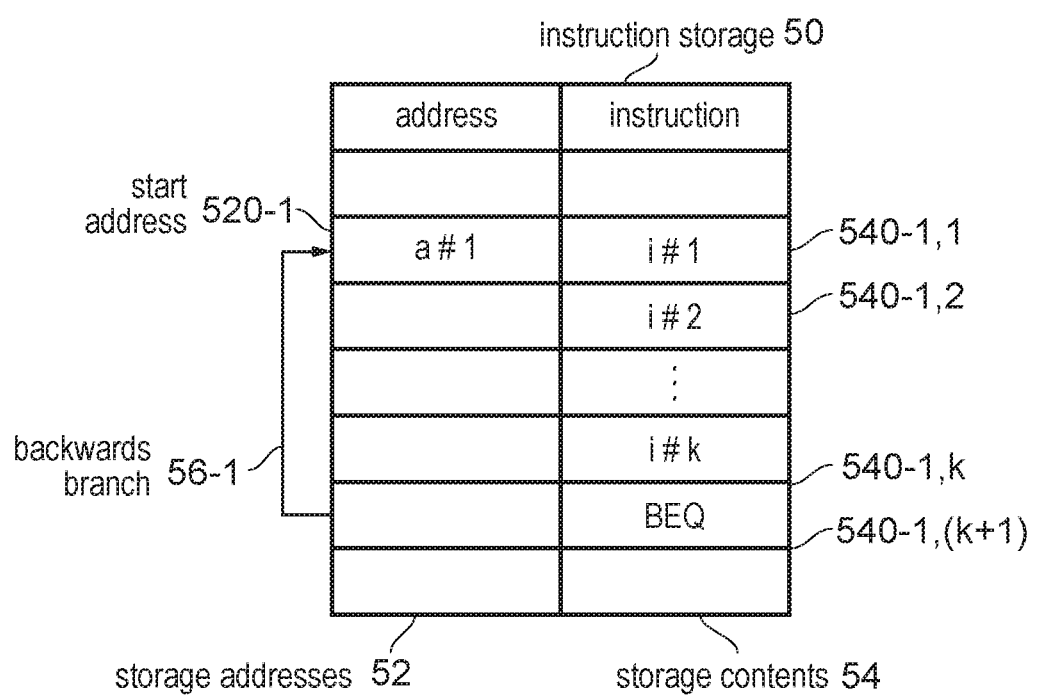
FIG. 5 schematically illustrates an example of a group of instructions.

FIG. 5 schematically illustrates an example of a group 5 of instructions. An instruction storage 50 may be configured to store, at storage addresses 52, storage contents 54. Thus, the storage content, e. g. instruction, at a particular storage location may be accessed, e. g. written or read, via the storage address of the location. It will be appreciated that the instructions may be referenced via virtual addresses, which may need to be translated into the physical addresses actually identifying the storage locations of the instructions. The group 5 of instructions 540-1,1, . . . 540-1,(k+1) may be stored at consecutive addresses beginning at start address 520-1. The group 5 of instructions 540-1,1, . . . 540-1,(k+1) may be accessed and/or identified via the start address a #1 520-1, for example. An arrow indicates a backwards branch 56-1 indicates that the group 5 of instructions 540-1,1, . . . 540-1,(k+1) forms a loop. The controller 300 mentioned above may, on detecting the backwards branch 56-1 to an instruction address lower than the instruction address of the branch instruction, terminate the current group of instructions and start tracking for a next group of instructions starting with the first instruction executed after the branch instruction.

FIG. 6 schematically illustrates an example of schedules 6 of groups of instructions. A schedule storage 60 may be configured to store start addresses (trace addresses) and schedules (traces) of groups of reordered instructions. The schedule of the group 5 of instructions, comprising reordered instructions 640-1,1, . . . 640-1,3 may be accessed and/or identified via the trace address a #1 620-1, for example.

FIG. 7 schematically illustrates an example of performance metrics 7 of groups of instructions. A performance storage 70 may be configured to store trace addresses 720, counter values 770 and values 780-1, . . . 780-m for performance metrics #1 . . . #m. The counter value c #1 and performance metric values v #1,1 . . . v #1,m of the group 5 of instructions may be accessed and/or identified via the trace address a #1, for example.

Figure 8:
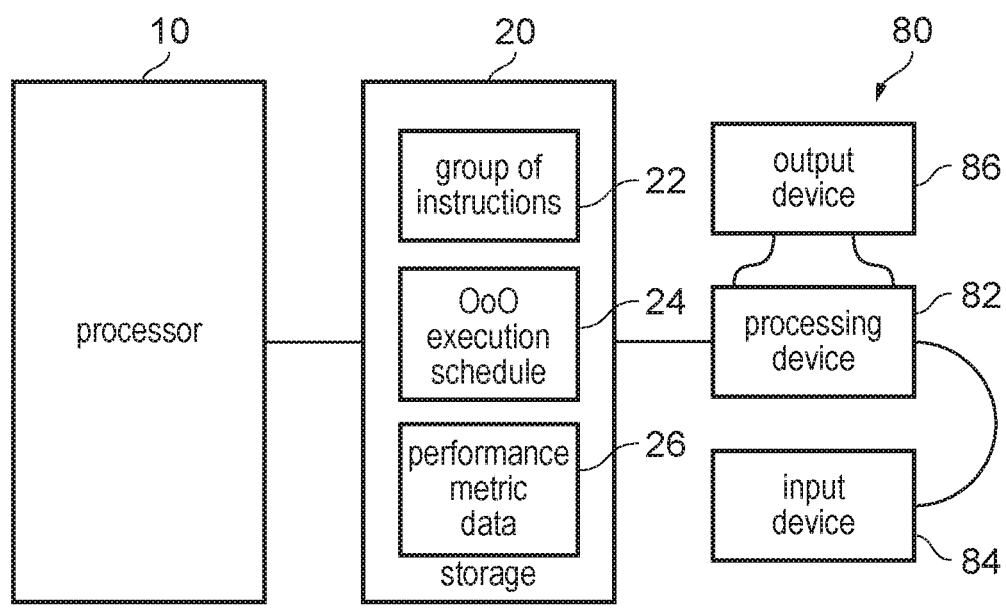
FIG. 8 schematically illustrates an example of a performance analysis system.

FIG. 8 schematically illustrates an example of a performance analysis system 8. The performance analysis system 8 may comprise a processor 10, storage 20 coupled to the processor 10 and computer 80 coupled to the storage 20.

The processor 10 may be configured as already described with reference to FIG. 1. The computer 80 may comprise a processing device 82, an input device 84, e. g. a keyboard, coupled to the processing device 82 and an output device 86, e. g. monitor, coupled to the processing device 82. The OoO execution schedule 24 may be output from the storage 20 and processed, e. g. analysed, by the computer 80, when repetition of the OoO execution schedule 24 is detected.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the operation. The words "configured to . . . " do not imply that the apparatus element needs to be changed in any way in order to provide the defined operation.

Although illustrative embodiments of the present technique have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

LIST OF REFERENCE NUMERALS 1 repetition detection system
2 multi-processor system
3 out-of-order processor and in-order processor system
4 repetition detection method
5 group of instructions
6 schedules of groups of instructions
7 performance metrics of groups of instructions
8 performance analysis system
10 processor
100 out-of-order processor
110 instruction storage
120 fetch
130 branch predictor
140 decode
150 rename
160 issue
162 dynamic scheduler
165 schedule trace cache
170 execute
172 level-1 cache
174 level-2 cache
180 registers
190 commit
192 reorder buffer
195 program counter of last committed instruction
20 storage
22 group of instructions
24 out-of-order execution schedule
26 performance metric data
30 repetition detection apparatus
32 determination unit
34 comparison unit
36 detection unit
300 controller
320 performance data storage
340 comparator
342 confidence counter
345 penalty value storage
370 clock
40 other processor
400 in-order processor
410 instruction storage
420 fetch
425 program counter
430 branch predictor
440 decode
460 issue
470 execute
480 registers
490 commit
4000 begin
4100 determining performance metric data
4200 performing comparison
4210 updating counter
4211 incrementing counter value
4212 decrementing counter value
4213 analysing performance metrics
4214 selecting first performance metric
4215 do determined data and previous data of selected performance metric differ?
4216 decrementing counter value by penalty value
4217 selecting penalty value from minor penalty value and major penalty value
4218 is selected performance metric last performance metrics?
4219 selecting next performance metric
4300 is counter value larger than confidence value?
4400 memoizing out-of-order execution schedule
4500 pausing dynamic recreation of out-of-order execution schedule
4600 transferring execution from out-of-order processor to another processor
4610 outputting out-of-order execution schedule from out-of-order processor
4620 inputting out-of-order execution schedule in other processor
4700 executing instances of memoized out-of-order execution schedule
4800 end
50 instruction storage
52 storage addresses
520-1 start address
54 storage contents
540-1,1, . . . 540-1,(k+1) instruction
56-1 backwards branch
60 schedule storage
620-1 trace address
640-1,1, . . . 640-1,3 reordered instruction
70 performance storage
720 trace addresses
770 counter values
780-1 performance metric #1 values
780-2 performance metric #2 values
780-$m$ performance metric #m values
80 computer/analyser
82 processing device
84 input device
86 output device

We claim:

1. A method of detecting repetition of an out-of-order execution schedule for a group of instructions executed by an out-of-order processor, said method comprising:
determining data indicative of at least one performance metric for an instance of execution of said group of instructions by said out-of-order processor;
performing a comparison of said determined data with previous data of said at least one performance metric for at least one previous instance of execution of said group of instructions by said out-of-order processor;
detecting repetition of said out-of-order execution schedule dependent on said comparison;

updating a counter in dependence on the comparison of said determined data and said previous data;
for an instance of repetition of said out-of-order execution schedule for said group of instructions, incrementing a counter value of said counter by a predetermined instance value; and
decrementing said counter value by at least one predetermined penalty value, when said determined data and said previous data differ,
wherein:
said detecting is dependent on said counter; and
said at least one predetermined penalty value comprises at least one of:
at least one minor penalty value for indicating a minor difference between said determined data and said previous data; and
at least one major penalty value for indicating a major difference between said determined data and said previous data.

2. The method as claimed in claim 1, wherein:
repetition of said out-of-order execution schedule is detected, when a degree of similarity between said determined data and said previous data is larger than a predetermined threshold.

3. The method as claimed in claim 1, wherein said at least one performance metric comprises at least one of:
a number of instructions executed in an instance of execution of said group of instructions;
a number of cycles required for an instance of execution of said group of instructions;
a number of cache hits achieved in an instance of execution of said group of instructions;
a number of cache misses incurred in an instance of execution of said group of instructions;
a number of branch mispredictions incurred in an instance of execution of said group of instructions; and
a number of instructions brought forward within said out-of-order execution schedule in an instance of execution of said group of instructions relative to instructions of said group of instructions being in order.

4. The method as claimed in claim 1, wherein repetition of said out-of-order execution schedule is detected in dependence on a comparison of the counter value and a predetermined confidence value.

5. The method as claimed in claim 4, wherein:
for one or more of said at least one performance metric, said at least one predetermined penalty value is capable of decrementing said counter value to ensure that comparison of the counter value with the predetermined confidence value indicates non-repetition of the out-of-order execution schedule after the counter value is decremented by the at least one predetermined penalty value.

6. The method as claimed in claim 1, further comprising:
selecting whether to decrement said counter value based on said at least one minor penalty value or said at least major penalty value in dependence on which one of said at least one performance metric said determined data and said previous data differ.

7. The method as claimed in claim 1, wherein said at least one minor penalty value comprises at least one of:
a penalty value for indicating a difference between numbers of cycles required for at least two instances;
a penalty value for indicating a difference between numbers of cache hits achieved in at least two instances;
a penalty value for indicating a difference between numbers of cache misses incurred in at least two instances; and
a penalty value for indicating a difference between numbers of instructions brought forward within said out-of-order execution schedule in at least two instances relative to instructions of said group of instructions being in order.

8. The method as claimed in claim 1, wherein said at least one major penalty value comprises at least one of:
a penalty value for indicating a difference between numbers of instructions executed in at least two instances; and
a penalty value for indicating a difference between numbers of branch mispredictions incurred in at least two instances.

9. The method as claimed in claim 1, further comprising:
memoizing said out-of-order execution schedule, when repetition of said out-of-order execution schedule is detected.

10. The method as claimed in claim 9, further comprising:
pausing dynamic recreation of said out-of-order execution schedule, when said out-of-order execution schedule is memoized.

11. The method as claimed in claim 9, further comprising:
executing instances of said out-of-order execution schedule based on said memoized schedule, when said out-of-order execution schedule is memoized.

12. The method as claimed in claim 1, further comprising:
transferring execution of instances of said out-of-order execution schedule from said out-of-order processor to another processor, when repetition of said out-of-order execution schedule is detected.

13. The method as claimed in claim 12, wherein transferring execution of instances of said out-of-order execution schedule comprises:
outputting said out-of-order execution schedule from said out-of-order processor; and
inputting said output out-of-order execution schedule in said other processor.

14. The method as claimed in claim 12, wherein:
said other processor is an in-order processor.

15. The method as claimed in claim 12, wherein:
said other processor is another out-of-order processor.

16. The method as claimed in claim 1, further comprising:
outputting said out-of-order execution schedule, when repetition of said out-of-order execution schedule is detected.

17. An apparatus for detecting repetition of an out-of-order execution schedule for a group of instructions executed by an out-of-order processor, said apparatus comprising:
a determination unit configured to determine data indicative of at least one performance metric for an instance of execution of said group of instructions by said out-of-order processor;
a controller comprising a comparator coupled to said determination unit and configured to perform a comparison of said determined data with previous data of said at least one performance metric for at least one previous instance of execution of said group of instructions by said out-of-order processor;
update a counter in dependence on the comparison of said determined data and said previous data;

for an instance of repetition of said out-of-order execution schedule for said group of instructions, increment a counter value of said counter by a predetermined instance value; and decrement said counter value by at least one predetermined penalty value, when said determined data and said previous data differ, wherein:

said detection of repetition is dependent on said counter; and said at least one predetermined penalty value comprises at least one of:

at least one minor penalty value for indicating a minor difference between said determined data and said previous data; and at least one major penalty value for indicating a major difference between said determined data and said previous data.

18. A non-transitory, computer-readable medium storing instructions that, when executed by a computer, cause said computer to perform a method of detecting repetition of an out-of-order execution schedule for a group of instructions executed by an out-of-order processor, said method comprising:

determining data indicative of at least one performance metric for an instance of execution of said group of instructions by said out-of-order processor;

performing a comparison of said determined data with previous data of said at least one performance metric for at least one previous instance of execution of said group of instructions by said out-of-order processor; and detecting repetition of said out-of-order execution schedule dependent on said comparison;

updating a counter in dependence on the comparison of said determined data and said previous data;

for an instance of repetition of said out-of-order execution schedule for said group of instructions, incrementing a counter value of said counter by a predetermined instance value; and decrementing said counter value by at least one predetermined penalty value, when said determined data and said previous data differ, wherein:

said detecting is dependent on said counter; and said at least one predetermined penalty value comprises at least one of:

at least one minor penalty value for indicating a minor difference between said determined data and said previous data; and at least one major penalty value for indicating a major difference between said determined data and said previous data.

\* \* \* \* \*